(12) United States Patent
Magin

(10) Patent No.: US 8,154,361 B2
(45) Date of Patent: Apr. 10, 2012

(54) COMMUNICATING OVER COAXIAL CABLE NETWORKS

(75) Inventor: Gregory Allen Magin, Ocala, FL (US)

(73) Assignee: Qualcomm Atheros, Inc., San Jose, CA (US)

( * ) Notice: Subject to any disclaimer, the term of this patent is extended or adjusted under 35 U.S.C. 154(b) by 0 days.

(21) Appl. No.: 12/540,521

(22) Filed: Aug. 13, 2009

(65) Prior Publication Data

US 2009/0302969 A1    Dec. 10, 2009

Related U.S. Application Data

(63) Continuation of application No. 11/200,910, filed on Aug. 10, 2005, now Pat. No. 7,592,880.

(51) Int. Cl.
*H01P 5/12* (2006.01)
*H03H 7/38* (2006.01)

(52) U.S. Cl. ......................................... 333/117; 333/123

(58) Field of Classification Search .................. 333/117, 333/118, 123, 125, 128, 129, 136
See application file for complete search history.

(56) References Cited

U.S. PATENT DOCUMENTS

| 3,671,885 A | 6/1972 | Pennypacker |
| 5,060,373 A | 10/1991 | Machura et al. |
| 5,524,281 A | 6/1996 | Bradley et al. |
| 6,015,315 A | 1/2000 | Ensign et al. |
| 6,094,175 A | 7/2000 | Alessi et al. |
| 7,594,249 B2 * | 9/2009 | Gurantz et al. ................. 725/78 |
| 2005/0114904 A1 | 5/2005 | Monk et al. |

FOREIGN PATENT DOCUMENTS

WO    WO 2004/080075    9/2004

OTHER PUBLICATIONS

Sevick, Design of Broadband Ununs With Impedance Ratios Less than 1:4; High Frequency Electronics, [Online], <http://www.highfrequencyelectronics.com/Archives/Nov04/HFE1104_Sevick.pdf>, Nov. 2004, pp. 44-49.
International Search Report and Written Opinion—PCT/US2006/031315, International Searching Authority, ISA/US, Sep. 20, 2007.

* cited by examiner

*Primary Examiner* — Dean O Takaoka

(57) ABSTRACT

A method for communicating over a coaxial cable network is described. The method includes identifying at least one port in the coaxial cable network that provides high mutual isolation among nodes of the coaxial cable network when the port is terminated with an impedance that matches a characteristic impedance of coaxial cable in the coaxial cable network. The method also includes terminating the identified port with an impedance that is substantially mismatched with the characteristic impedance of the coaxial cable, and transmitting a signal from a first node in the network to a second node in the network.

23 Claims, 15 Drawing Sheets

COMMUNICATING OVER COAXIAL CABLE NETWORKS

This application is a continuation application of and claims priority under 35 U.S.C. §120 to application Ser. No. 11/200,910, filed Aug. 10, 2005 now U.S. Pat. No. 7,592,880, which is incorporated herein by reference.

TECHNICAL FIELD

This invention relates to communicating over coaxial cable networks.

BACKGROUND

Coaxial cable transmission lines can be used to route radio frequency (rf) signals throughout a home. The characteristics of a coaxial cable determine what maximum frequency the cable will support for high quality (e.g., high signal-to-noise ratio) transmission of analog or digital signals. Older cable existing in many homes may support high quality transmission of signals up to around 900 MHz. Other types of cable (e.g., cable used for satellite television signals) may support higher frequencies up to around 1700 MHz. The frequency limit also determines the maximum data rate limits for digital signals (e.g., digital video or internet protocol (IP) data packets).

A cable signal typically enters a home over a single source port and from there is distributed throughout the home. A distribution network of coaxial cable is typically formed by connecting cables to splitters that passively couple an incoming signal to two or more output ports. This network typically has a tree topology in which information flows downstream from the source (at the "root" of the tree) to each terminating device such as a television, set top box, or cable modem (the "leaves" of the tree). In some cases (e.g., for a cable modem or interactive television service) information also flows upstream from a terminating device to the source port.

SUMMARY

In a first aspect, the invention features a method for communicating over a coaxial cable network. The method includes identifying at least one port in the coaxial cable network that provides high mutual isolation among nodes of the coaxial cable network when the port is terminated with an impedance that matches a characteristic impedance of coaxial cable in the coaxial cable network. The method also includes terminating the identified port with an impedance that is substantially mismatched with the characteristic impedance of the coaxial cable, and transmitting a signal from a first node in the network to a second node in the network.

Preferred implementations of this aspect of the invention may incorporate one or more of the following:

The identified port includes an input port to a splitter having at least two output ports that are mutually isolated when the input port is terminated with an impedance that matches the characteristic impedance of the coaxial cable.

The splitter includes a hybrid splitter.

The identified port is positioned in the network to distribute an incoming signal from a source to terminal nodes of the coaxial cable network.

The source is a cable television feeder cable, a terrestrial antenna, or a satellite dish.

Terminating the identified port with the mismatched impedance includes coupling the incoming signal from the source to the identified port with an output impedance that is substantially mismatched with the characteristic impedance of the coaxial cable.

Terminating the identified port with the mismatched impedance includes uncoupling the source from the identified port.

Transmitting the signal from the first node to the second node includes coupling a signal from the first node with an output impedance that is substantially mismatched with the characteristic impedance of the coaxial cable.

The output impedance is substantially smaller than the characteristic impedance of the coaxial cable.

The output impedance is smaller than about 10% of the characteristic impedance of the coaxial cable.

Transmitting the signal from the first node to the second node includes coupling a signal to the second node with an input impedance that is that is substantially mismatched with the characteristic impedance of the coaxial cable.

The input impedance is substantially larger than the characteristic impedance of the coaxial cable.

The output impedance is larger than about 300% of the characteristic impedance of the coaxial cable.

The coaxial cable network has a tree topology with the identified port at the root of the tree.

In a second aspect, the invention features a coaxial cable network. The network includes a source port providing an input signal, a coaxial cable coupling the source port to a first splitter, and a plurality of coaxial cables providing an interface for nodes of the network. At least some of the coaxial cables are coupled to the source port over a path that includes at least one splitter. At least one splitter port provides high mutual isolation among nodes of the coaxial cable network when the splitter port is terminated with an impedance that matches a characteristic impedance of coaxial cable in the coaxial cable network. The splitter port is terminated with an impedance that is substantially mismatched with the characteristic impedance of the coaxial cable.

Preferred implementations of this aspect of the invention may incorporate one or more of the following:

The splitter port includes an input port to the first splitter, the first splitter having at least two output ports that are mutually isolated when the input port is terminated with an impedance that matches the characteristic impedance of the coaxial cable.

The coaxial cable network has a tree topology with the input port to the first splitter at the root of the tree.

The first splitter is positioned in the network to distribute the incoming signal from the source port to terminal nodes of the coaxial cable network.

The coaxial cable network further includes a node coupled to a coaxial cable interface with an output impedance that is substantially mismatched with the characteristic impedance of the coaxial cable.

The coaxial cable network further includes a node coupled to a coaxial cable interface with an input impedance that is that is substantially mismatched with the characteristic impedance of the coaxial cable.

Among the many advantages of the invention (some of which may be achieved only in some of its various aspects and implementations) are the following.

Mismatching the impedance at one or more splitters in a coaxial cable network reduces attenuation due to isolation between nodes in the network which increases the data rate and reliability of communication between nodes. Placing an impedance mismatched gateway device at the root node of a tree network enables communication among the leaf nodes while maintaining the ability to distribute a source signal to the leaf nodes. Coupling transmitting devices to a coaxial cable network with a low output impedance and coupling receiving devices to the coaxial cable network with a high input impedance provides low-loss communication over a wide range of network characteristics including, for example, various cable lengths and various numbers of splitters.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

System Overview

Figure 1:
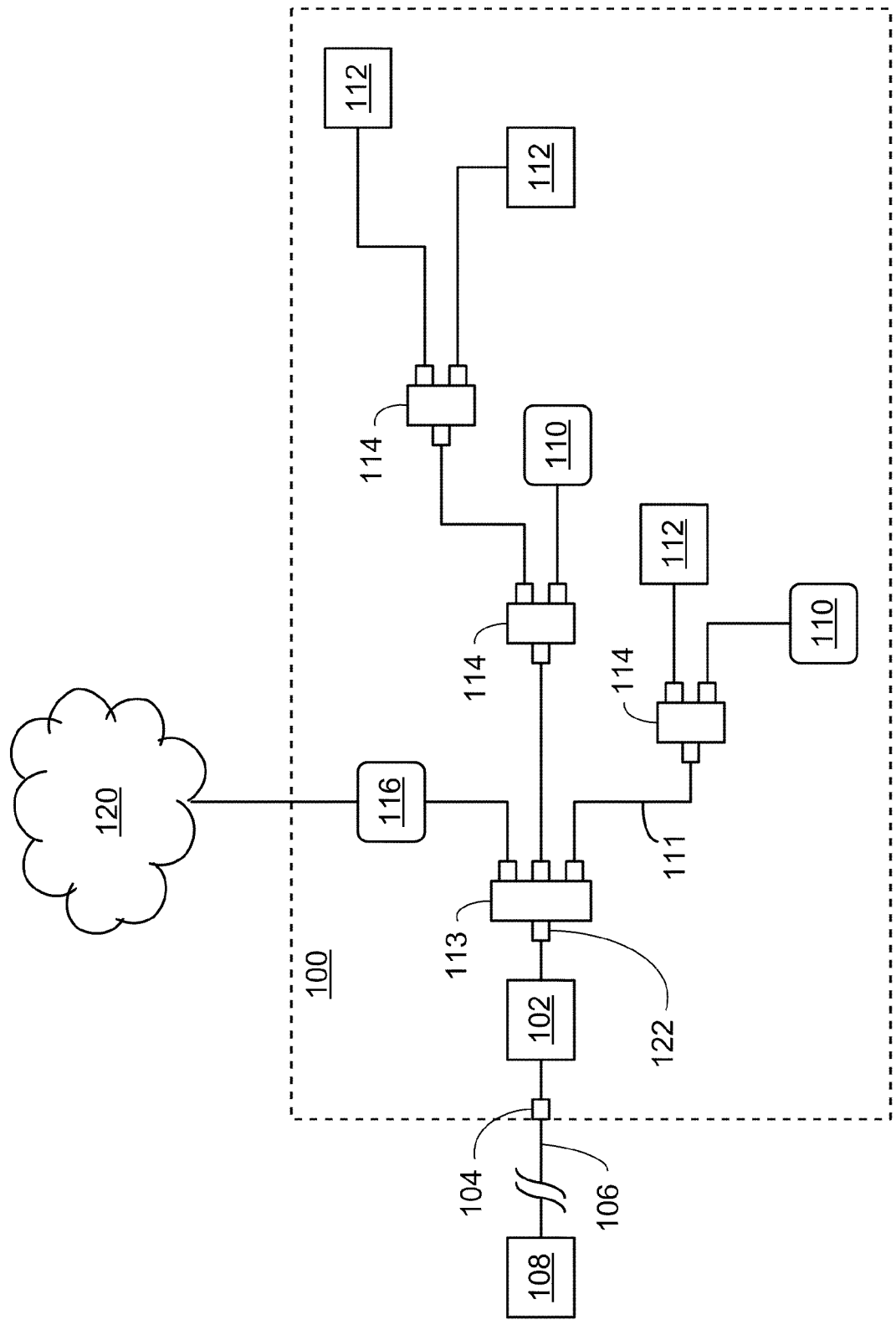
FIG. 1 is a schematic diagram of a coaxial cable network.

Referring to FIG. 1, a coaxial cable network 100 in a home includes a source port 104 for a source cable 106 that carries an incoming signal from a source 108 outside of the home. For example, the source 108 can be wired source that provides a signal over a distribution network that is fed from a head-end at a cable television distribution center to distribution coaxial cables (e.g., "trunk" or "feeder" cables). Alternatively, the source 108 can be wireless source such as a terrestrial antenna that receives a signal from a broadcast tower, or a satellite dish that receives a signal from a satellite.

The coaxial cable network 100 distributes a signal throughout the home from the source port 104, through a gateway device 102, to standard devices 110 (e.g., cable or satellite television set top boxes) and network devices 112 over coaxial cable 111 (e.g., RG6 type coaxial cable). The coaxial cable network 100 includes splitters that split input signal power among multiple output ports. In this exemplary network 100, the first splitter 113 is a 4-port, 3-way splitter that divides the signal at the input port evenly among three output ports. Alternatively, some splitters provide more power to some ports than to others. These uneven splitters can be used to ensure certain devices (e.g., cable modems) have a large enough signal, or to provide more power to ports that will undergo further splitting to feed more downstream terminal nodes or "leaf" nodes. The coaxial cable network 100 also includes 3-port, 2-way splitters 114 that divide the signal at the input port evenly between two output ports. The coaxial cable network 100 includes a bridge device 116 that couples the network 100 to a secondary network 120 such as a power line communication network that uses existing AC wiring in a house to exchange information between nodes that interface with AC outlets.

The gateway device 102 enables the network devices 112 to communicate with each other, while continuing to distribute the incoming signal from the source port 104 to the standard devices 110. In a typical cable distribution network in a home, to reduce interference on the network, the splitters 113 and 114 provide high isolation among the output ports such that a signal entering one output port of the splitter is coupled to the input port and effectively cancelled at the other output port(s). For example, a "hybrid splitter" (or "magic tee" splitter) is typically designed to provide high isolation among output ports for a given impedance at the input port. As explained in more detail below, the impedance at which this high isolation occurs is designed to match the characteristic impedance of a given type of coaxial cable. Isolation of 20 to 60 dB is typical in practice depending on the precision of the components. This high attenuation would reduce the signal-to-noise ratio (SNR) which would in turn reduce the channel capacity (data rate).

The gateway device 102 terminates the "root" port 122 of the coaxial cable network with an impedance that is mismatched with the characteristic impedance designed to provide high isolation. As described in more detail below, this mismatch "propagates" throughout the tree-structured network 100 to mismatch the input ports of the other splitters enabling any node in the network to communicate with any other node without suffering drastic reduction in SNR due to high isolation. Alternatively, the root port 122 can be disconnected from the source port 104 to mismatch the network 100 without the need for a gateway device 102 (though this configuration would no longer distribute the incoming signal to the standard devices 110).

The standard devices 110 are configured to receive the signal from the source port 104 (and optionally to transmit signals to the source port 104) without interfering with each other. In particular, the standard devices 110 terminate the coaxial cables 111 with the characteristic impedance $Z_0$ of the cable 111 (e.g., for RG6 coaxial cable $Z_0$=75 Ohms). Even though the splitters no longer provide high isolation, this impedance matching effectively eliminates reflections of a signal from the input of one standard device 110 that could interfere with another standard device 110.

The coaxial cable network 100 is coupled to network devices 112 that are configured to transmit signals to and receive signals from other network devices 112 coupled to the network 100. The network devices 112 are half-duplex devices that switch between a transmit state and a receive state (the default state). The network devices 112 can use any of a variety of types of medium access control (MAC) protocols such as a carrier sense multiple access with collision avoidance (CSMA/CA) protocol to coordinate communication over the network 100. The network devices 112 can optionally terminate the coaxial cables 111 with an impedance that depends on whether the device is in the transmit state or the receive state to improve signal characteristics such as signal-to-noise ratio (SNR), as described in more detail below.

The standard devices 110 and the network devices 112 communicate over different frequency bands using filters to reduce any potential interference between the standard and network devices. For example, in one scenario the standard devices receive a signal in the 50 to 800 MHz range and the network devices communicate in the 2 to 28 MHz range. Each network device 112 includes a 35 MHz low-pass filter (LPF) to interface with the network 100, and each standard device includes a 50 MHz high-pass filter (HPF) to interface with the network 100. The combination of the LPFs and HPFs reduce potential interference caused by signal energy transmitted from or reflected from unmatched network devices 112.

Alternatively, all of the devices coupled to the output ports of the splitters can be network devices 112, in which case, the filters are not necessarily used.

Impedance Matching and Mismatching

Figure 2A:
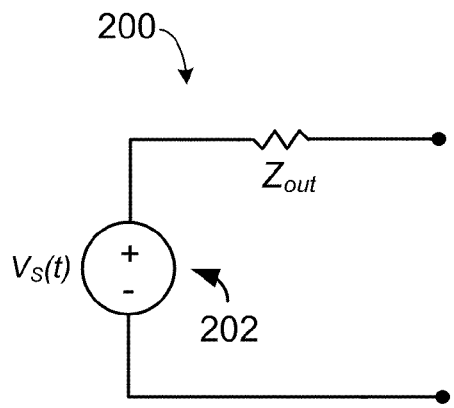
FIG. 2A is a circuit diagram of a source circuit element.
Figure 2B:
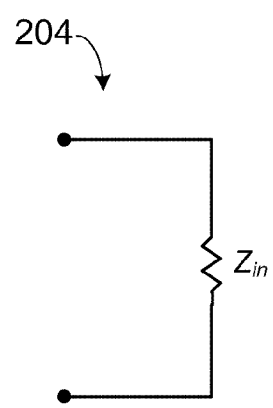
FIG. 2B is a circuit diagram of a load circuit element.

The characteristics of impedance matching and mismatching can be understood by examining simplified circuit models of the coaxial cable network 100 and the various devices coupled to the network acting as transmitters and/or receivers. Referring to FIG. 2A, when a device is transmitting a signal into a port of the coaxial cable network, that device can be modeled as a "source" circuit element 200 having a voltage source 202 that provides a source voltage signal $V_S(t)$ in series with an impedance $Z_{out}$ that represents the output impedance of the device. Referring to FIG. 2B, when a device is receiving a signal over a coaxial cable of the network 100, that device can be modeled as a "load" circuit element 204 having an impedance $Z_{in}$ that represents the input impedance of the device.

Figure 2C:
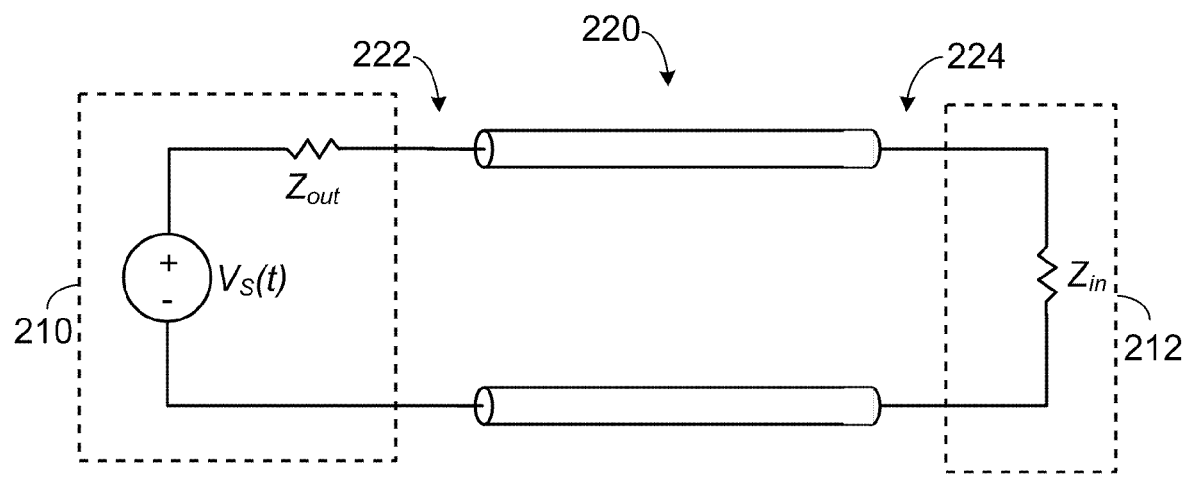
FIG. 2C is a circuit diagram of transmitting device connected to a receiving device by a transmission line.

Referring to FIG. 2C, a transmitting device 210, represented by source circuit element 200, is connected to a receiving device 212, represented by load circuit element 204, over a coaxial cable modeled as a transmission line 220 having a length l. The voltage signal $V_R(t)$ that is received by the receiving device 212 is a function of the source voltage signal $V_S(t)$, but also depends on the impedances $Z_{out}$ and $Z_{in}$ and the characteristic impedance $Z_0$ of the transmission line 220. In general, to the extent that either $Z_{out\ or\ Zin}$ differs from the characteristic impedance $Z_0$, there will be reflections that propagate between the input port 222 and output port 224 of the transmission line 220 causing distortions in the received voltage signal $V_R(t)$ including frequency selective distortions and time distortions such as multiple delayed versions of a signal arriving over a time period called "delay spread." For a transmission line terminated with a "mismatched" load impedance at the output port 224 that differs from the characteristic impedance $Z_0$, the effective impedance seen at the input port 222 is transformed by the transmission line (e.g., as given by a Smith Chart). For example, depending on the length l, a real load impedance (i.e., resistance) of $R_L$ can be transformed to an inductive or capacitive impedance or to a real impedance of $Z^2_0/R_L$ (when l is a quarter wavelength). However, a mismatched impedance remains mismatched for any length l or signal frequency. The expected behavior of a given network can be predicted according to standard transmission line theory where each section of coaxial cable in the network is modeled as a transmission line.

Typically, the input and output impedances of devices coupled to the network 100 are "matched" to the characteristic impedance of the coaxial cable (i.e., $Z_{out}=Z_0$ and $Z_{in}=Z_0$). In this matched case, the reflections are eliminated (or in practice, due to the limited precision of the components, at least greatly reduced) and the received voltage signal $V_R(t)$ is related to the source voltage signal as $V_R(t)=0.5\ V_S(t-l/v)$, where v is the propagation velocity of the transmission line (typically around 0.6-0.8 times the speed of light for coaxial cables). In practice, for a matched transmission line the received voltage signal is a scaled and delayed version of the source voltage signal over a wide range of frequencies, and does not suffer the frequency distortions or delay spread of the mismatched transmission line.

A typical splitter is designed to terminate a coaxial cable coupled to its input port with a matched impedance when the output ports of the splitter are terminated with matched load impedances. The typical splitter is also designed to provide a matched output impedance to each load. Thus, the splitter is designed to preserve the impedance matching characteristics of a network. In addition to preserving impedance matching, a typical splitter is designed to provide high isolation among its output ports.

Figure 2D:
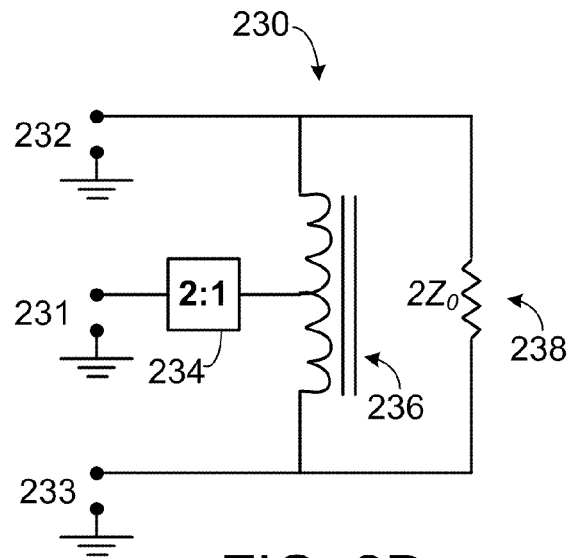
FIG. 2D is a circuit diagram of a hybrid splitter.

Referring to FIG. 2D, one example of a 3-port, 2-way splitter 114 having high isolation among output ports is a hybrid splitter modeled as a circuit 230 that has a single input port 231 and two output ports 232 and 233. The input port 231 is coupled to a 2:1 impedance transformer 234 that transforms the output impedance of a device coupled to the input port 231 by a factor of ½ (e.g., a transformer with a turns ratio of √2:1 yields an impedance ratio of 2:1). The three ports are connected to a center-tap autotransformer 236 which couples signals among some of the ports under certain conditions. A shunt resistor 238 is connected to the autotransformer 236 to establish conditions such that the output ports 232 and 233 can be mutually isolated.

Figure 2E:
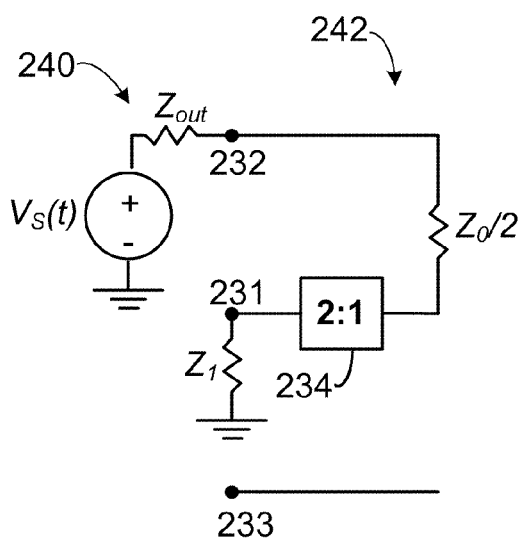
FIGS. 2E and 2F are diagrams of equivalent circuits modeling the state of the hybrid splitter.
Figure 2F:
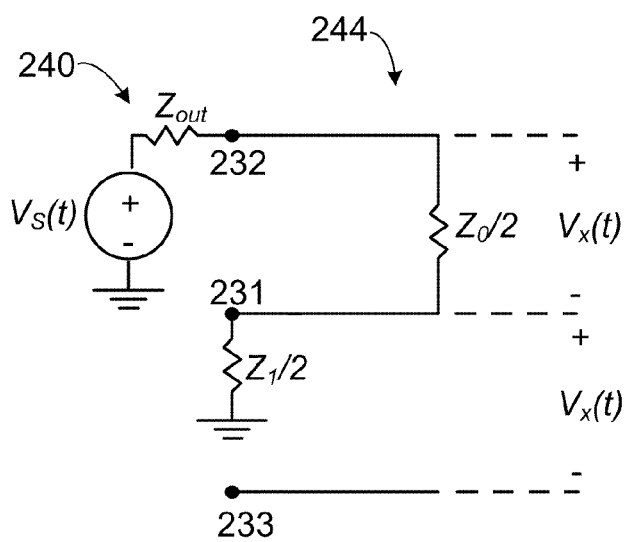

Due to the symmetry of the circuit 230, an input signal at port 231 is evenly divided between ports 232 and 233. However, when a signal is applied to the output port 232, the circuit 230 sets a voltage at the other output port 233 based on the impedance at the input port 231. Referring to FIG. 2E, a source 240 coupled to the output port 232 sees the equivalent circuit 242 due to the impedance transformation properties of the autotransformer 236. In particular, the autotransformer 236 transforms the impedance $2Z_0$ of the shunt resistor 238 by a factor of ¼ (since the turns ratio is ½) to a value of $Z_0/2$. Similarly, the impedance transformer 234 transforms the impedance $Z_1$ at the input port 231 by a factor of ½ to a value of $Z_1/2$. Thus, the source 240 sees the equivalent circuit 244 (FIG. 2F) and applies a source voltage $V_S(t)$ across three impedances: the output impedance $Z_{out}$, an impedance $Z_0/2$ due to the splitter circuit 230, and an impedance $Z_1/2$ due to the termination of input port 231.

The properties of autotransformer 236 ensure that the voltage drop $V_x(t)$ across the top half of the autotransformer 236 is the same as the voltage drop across the bottom half of the autotransformer. When the impedance $Z_1$ at the input port 231 is equal to the characteristic impedance $Z_0$, the voltage drop $V_x(t)$ across the top half of the autotransformer 236 is equal to the voltage drop from the mid-point of the autotransformer 236 to ground. Therefore, in this "matched input port" case, the voltage drop $V_x(t)$ across the bottom half of the autotransformer 236 sets the voltage at the output port 233 to ground, regardless of the value of the source voltage $V_S(t)$ or source output impedance $Z_{out}$. In this case, all of the power delivered into output port 232 is coupled to the input port 231 (neglecting internal splitter losses). This ideal model exhibits complete isolation, however, in practice hybrid splitters suffer from leakage current and leakage inductance such that isolation of 20 to 60 dB is possible over an operating bandwidth, depending on the precision of the splitter components.

When the impedance $Z_1$ at the input port 231 is not equal to the characteristic impedance $Z_0$, the voltage drop $V_x(t)$ across the top half of the autotransformer 236 is not equal to the voltage drop from the mid-point of the autotransformer 236 to ground. Therefore, in this "mismatched input port" case, the voltage drop $V_x(t)$ across the bottom half of the autotransformer 236 sets the voltage at the output port 233 to some proportion of the source voltage $V_S(t)$ depending on the ratio of the impedances $Z_1$ and $Z_0$. Thus, even in the ideal case, the isolation degrades and a signal can pass from output port 232 to output port 233 without suffering severe attenuation.

FIGS. 3A-3D show transfer responses for a simulation of a coaxial cable network based on an ideal hybrid splitter circuit model. The simulated network includes a voltage controlled voltage source with series output resistor connected to the input port "Port 1" of the splitter over a 50 feet length of 75-Ohm coaxial cable to provide a variable impedance drive to the network. Two additional voltage controlled voltage sources with shunt input resistors are connected to the output ports "Port 2" and "Port 3" over 50 ft. lengths of 75-Ohm coaxial cable, respectively, to provide variable impedance output loads for the network. FIGS. 3A-3D show the transfer response between ports of the simulated network under a variety of terminating conditions for the source and loads.

Figure 3A:
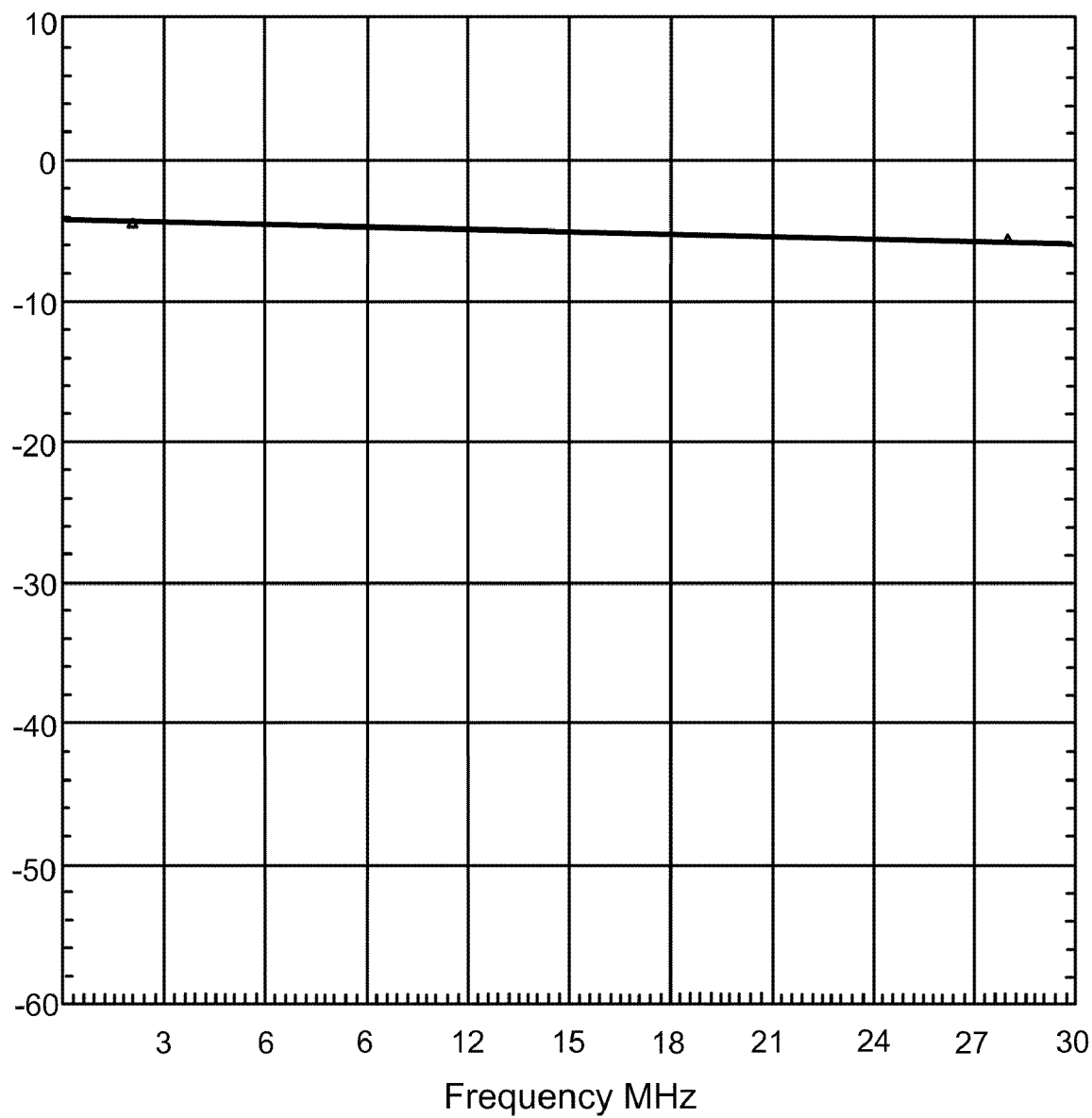
FIGS. 3A-3D are plots of transfer responses for a simulation of a coaxial cable network.
Figure 3B:
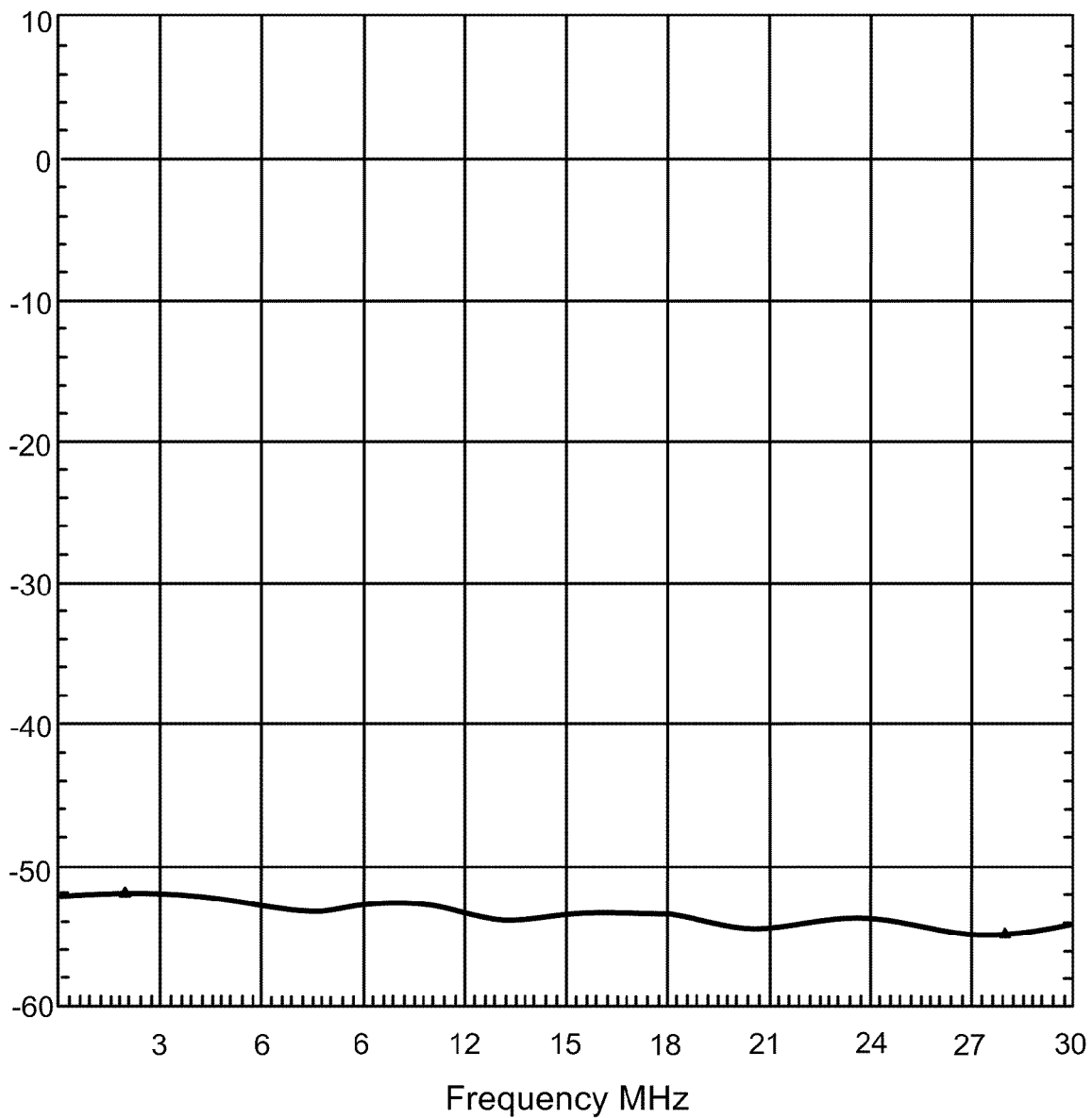

FIGS. 3A and 3B show transfer responses with the cable termination impedances for all three ports "matched" to the cable characteristic impedance of 75 Ohms. In the plot of FIG. 3A, showing an input-to-output response, the attenuation in decibels (dB) of the path from Port 1 to Port 2 is nearly flat as a function of frequency over a bandwidth of 0 to 30 MHz. Internal splitter power losses (e.g., due to resistive power dissipation) are minimal in practice and are modeled as 1 dB in this example. The nominal total attenuation of around 4 dB is due to the combination of this internal splitter loss, the dielectric loss of the coaxial cable (which increases with frequency), and loss due to a voltage divider effect where some power is dissipated in the output resistor of the source. The simulation models the coaxial cables using characteristics of an RG59 type coaxial cable.

In the plot of FIG. 3B, showing an output-to-output transfer response as a function of frequency, the input port cable termination is set to 74 Ohms to simulate the likely conditions of imperfect impedance matching which results in output port isolation that is not infinite. The cable termination at Port 2 and Port 3 are 75 Ohms. The resulting transfer response plot shows the high attenuation of the path from Port 2 to Port 3 of over 50 dB. The oscillation in the transfer response is due to the changing impedance transformation properties of the 50 ft. coaxial cable with changing frequency (according to standard transmission line theory).

Figure 3C:
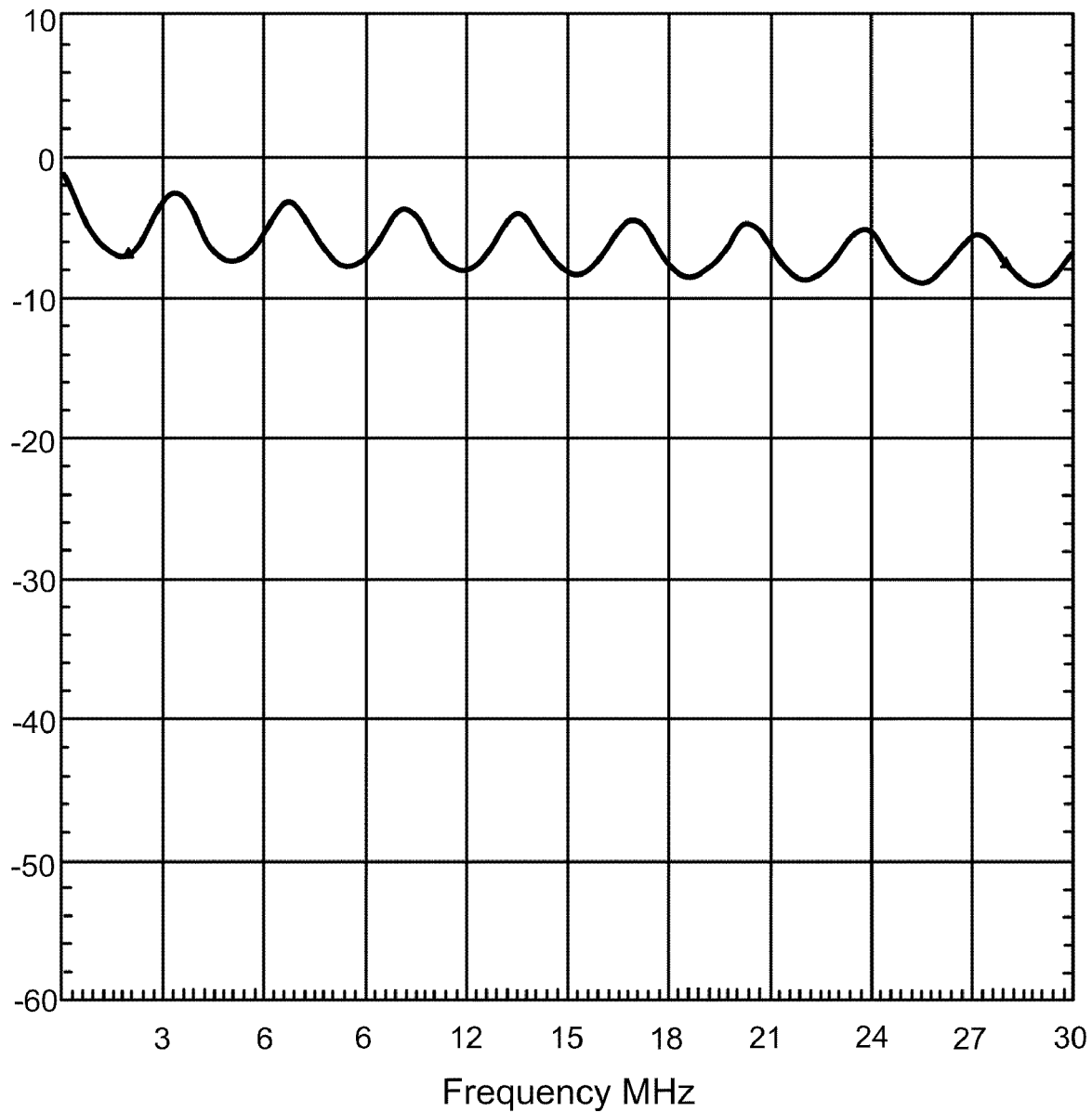

FIG. 3C shows an output-to-output transfer response as a function of frequency with the cable termination impedance for Port 1 set to 250 Ohms, for Port 2 set to 5 Ohms, and for Port 3 set to 250 Ohms. This configuration corresponds to a simple two leaf tree network in which the root node is terminated with a mismatched high impedance, one leaf node is terminated with a mismatched low impedance, and the other leaf node is terminated with a mismatched high impedance. As described in more detail below, in some implementations network devices 112 are configured to use a low impedance for transmission and a high impedance for reception. The resulting transfer response plot shows the lowered attenuation of the path from Port 2 to Port 3 of around 0 to 10 dB.

Figure 3D:
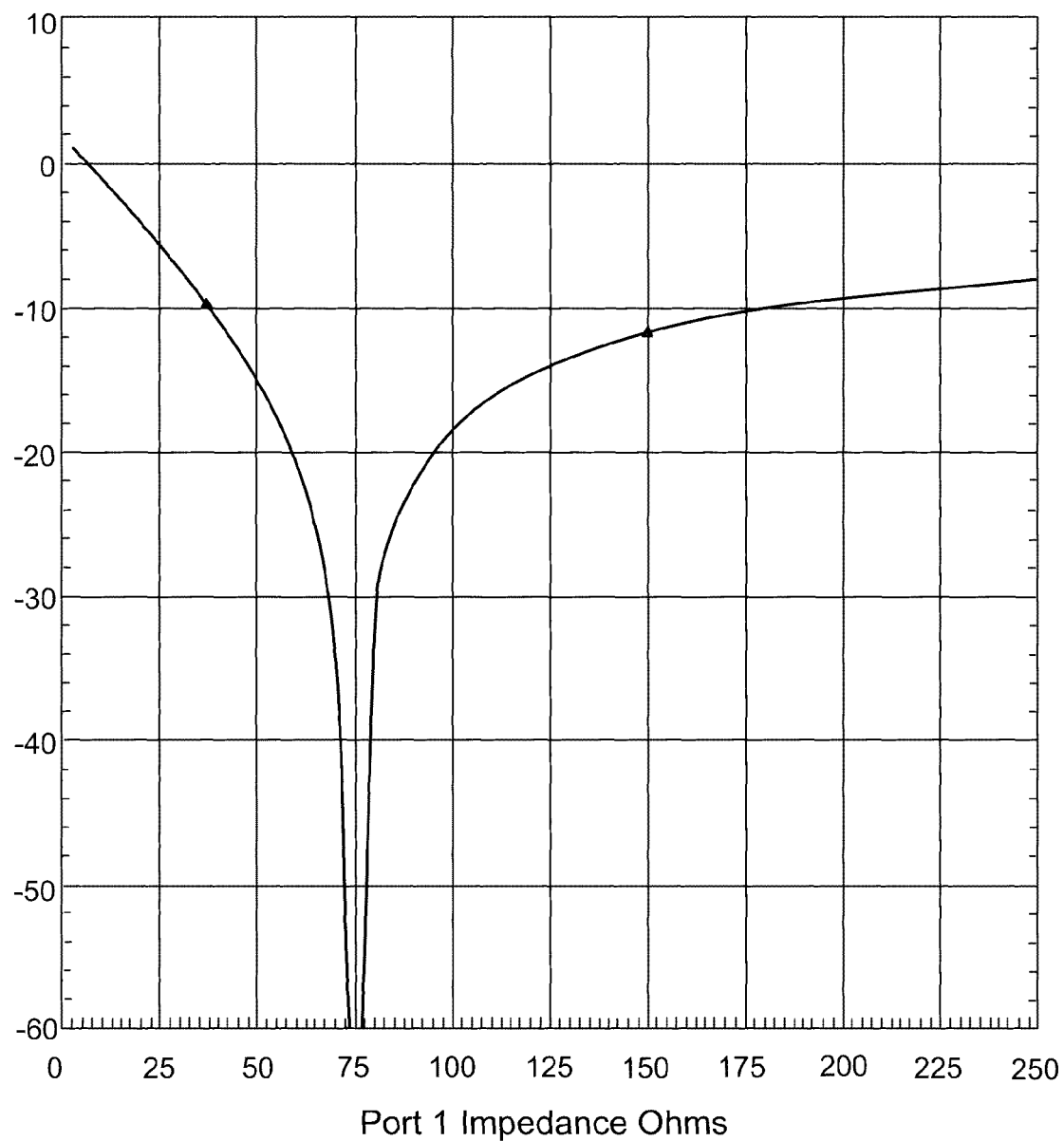

FIG. 3D shows an output-to-output transfer response as a function of input Port 1 cable termination impedance as it is varied from 5 to 250 Ohms. The frequency for the response shown in FIG. 3D is assumed to be 15 MHz. The cable termination impedances of Port 2 and Port 3 are the same as in the plot of FIG. 3C. The resulting transfer response plot shows the dramatic rise in attenuation (or equivalently the fall in transfer response) of the path from Port 2 to Port 3 that occurs when the cable termination impedance at the input Port 1 approaches the 75-Ohm characteristic impedance of the transmission line at which the splitter is designed to have high output port isolation.

Signal Modulation

A coaxial cable network in which one or more are mismatched tends to suffer from increased passband ripple in the frequency domain and increased delay spread in the time domain. Both are artifacts caused by reflection of a signal at a mismatched end of a coaxial cable transmission line. Some high-speed digital communications signal modulation techniques do not tolerate excessive passband ripple or delay spread.

To achieve robust communication performance in the presence of passband ripple and delay spread, the network devices 112 use Orthogonal Frequency Division Multiplexing (OFDM), also known as Discrete Multi Tone (DMT). OFDM is a spread spectrum signal modulation technique in which the available bandwidth is subdivided into a number of narrowband, low data rate channels or "carriers." To obtain high spectral efficiency, the spectra of the carriers are overlapping and orthogonal to each other. Data are transmitted in the form of symbols that have a predetermined duration and encompass some number of carriers. The data transmitted on these carriers can be modulated in amplitude and/or phase, using modulation schemes such as Binary Phase Shift Key (BPSK), Quadrature Phase Shift Key (QPSK), or m-bit Quadrature Amplitude Modulation (m-QAM).

In OFDM transmission, data are transmitted in the form of OFDM "symbols." Each symbol has a predetermined time duration or symbol time $T_s$. Each symbol is generated from a superposition of N sinusoidal carrier waveforms that are orthogonal to each other and form the OFDM carriers. Each carrier has a peak frequency $f_i$ and a phase $\Phi_i$ measured from the beginning of the symbol. For each of these mutually orthogonal carriers, a whole number of periods of the sinusoidal waveform is contained within the symbol time $T_s$. Equivalently, each carrier frequency is an integral multiple of a frequency interval $\Delta f=1/T_s$. The phases $\Phi_i$ and amplitudes $A_i$ of the carrier waveforms can be independently selected (according to an appropriate modulation scheme) without affecting the orthogonality of the resulting modulated waveforms. The carriers occupy a frequency range between frequencies $f_1$ and $f_N$ referred to as the OFDM bandwidth.

Figure 4:
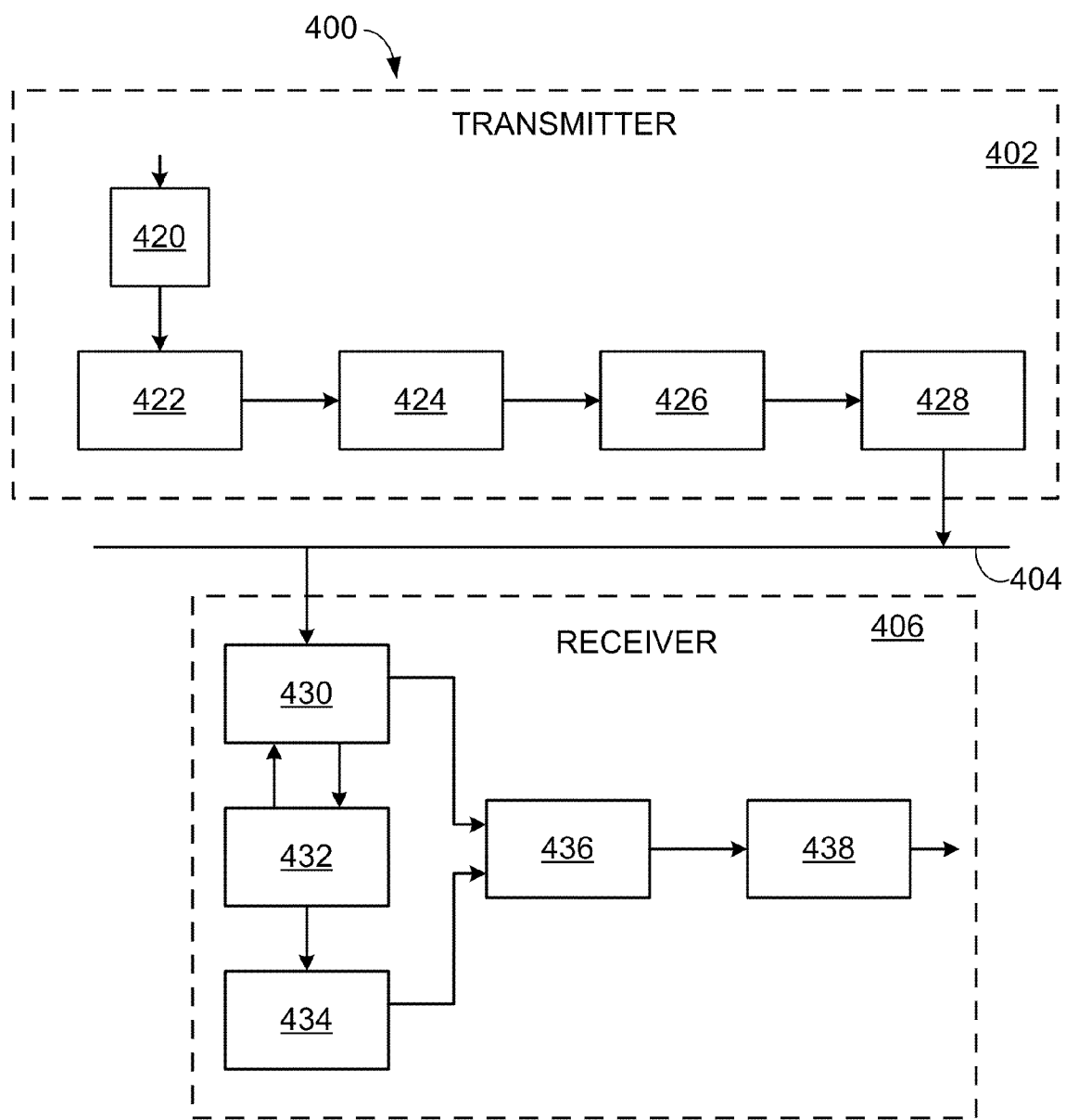
FIG. 4 is a schematic diagram of a communication system.

Referring to FIG. 4, a communication system 400 includes a transmitter 402 for transmitting a signal (e.g., a sequence of OFDM symbols) over a communication medium 404 to a receiver 406. The transmitter 402 and receiver 406 can be incorporated into network devices coupled to the coaxial cable network (e.g., as part of a device transceiver). The communication medium 404 can represent a path from one device to another over the coaxial cable network, or a path through another type of network such as a power line network. Due to their being designed for much lower frequency transmissions, AC wiring exhibits varying channel characteristics at the higher frequencies used for data transmission (e.g., depending on the wiring used and the actual layout). As with mismatched coaxial cable network 100, a power line network exhibits distortion due to multipath delay spread. The use of OFDM signals can improve reliability of communication in coaxial cable networks, power line networks, or bridged networks including both coaxial cable and power line sections, as described in more detail below.

At the transmitter 402, modules implementing the PHY layer receive an input bit stream from a medium access control (MAC) layer. The bit stream is fed into an encoder module 420 to perform processing such as scrambling, error correction coding and interleaving.

The encoded bit stream is fed into a mapping module 422 that takes groups of data bits (e.g., 1, 2, 3, 4, 6, 8, or 10 bits), depending on the constellation used for the current symbol (e.g., a BPSK, QPSK, 8-QAM, 16-QAM constellation), and maps the data value represented by those bits onto the corresponding amplitudes of in-phase (I) and quadrature-phase (Q) components of a carrier waveform of the current symbol. This results in each data value being associated with a corresponding complex number $C_i = A_i \exp(j\Phi_i)$ whose real part corresponds to the I component and whose imaginary part corresponds to the Q component of a carrier with peak frequency $f_i$. Alternatively, any appropriate modulation scheme that associates data values to modulated carrier waveforms can be used.

The mapping module 422 also determines which of the carrier frequencies $f_1, \ldots, f_N$ within the OFDM bandwidth are used by the system 400 to transmit information. For example, some carriers that are experiencing fades can be avoided, and no information is transmitted on those carriers. Instead, the mapping module 422 uses coherent BPSK modulated with a binary value from the Pseudo Noise (PN) sequence for that carrier. For some carriers (e.g., a carrier i=10) that correspond to restricted bands (e.g., an amateur radio band) on a medium 404 that may radiate power no energy is transmitted on those carriers (e.g., $A_{10}=0$).

An inverse discrete Fourier transform (IDFT) module 424 performs the modulation of the resulting set of N complex numbers (some of which may be zero for unused carriers) determined by the mapping module 422 onto N orthogonal carrier waveforms having peak frequencies $f_1, \ldots, f_N$. The modulated carriers are combined by IDFT module 424 to form a discrete time symbol waveform S(n) (for a sampling rate $f_R$), which can be written as $$S(n) = \sum_{i=1}^{N} A_i \exp[j(2\pi i n / N + \Phi_i)] \quad \text{Eq. (1)}$$

where the time index n goes from 1 to N, $A_i$ is the amplitude and $\Phi_i$ is the phase of the carrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 426 combines a sequence of consecutive (potentially overlapping) symbols into a "symbol set" that can be transmitted as a continuous block over the communication medium 404. The post-processing module 426 prepends a preamble to the symbol set that can be used for automatic gain control (AGC) and symbol timing synchronization. To mitigate intersymbol and intercarrier interference (e.g., due to imperfections in the system 400 and/or the communication medium 404) the post-processing module 426 can extend each symbol with a cyclic prefix that is a copy of the last part of the symbol. The post-processing module 426 can also perform other functions such as applying a pulse shaping window to subsets of symbols within the symbol set (e.g., using a raised cosine window or other type of pulse shaping window) and overlapping the symbol subsets.

An Analog Front End (AFE) module 428 couples an analog signal containing a continuous-time (e.g., low-pass filtered) version of the symbol set to the communication medium 404. The effect of the transmission of the continuous-time version of the waveform S(t) over the communication medium 404 can be represented by convolution with a function g(τ;t) representing an impulse response of transmission over the communication medium. The communication medium 404 may add noise n(t), which may be random noise and/or narrow-band noise emitted by a jammer.

At the receiver 406, modules implementing the PHY layer receive a signal from the communication medium 404 and generate a bit stream for the MAC layer. An AFE module 430 operates in conjunction with an Automatic Gain Control (AGC) module 432 and a time synchronization module 434 to provide data and timing information to a discrete Fourier transform (DFT) module 436. After synchronizing and amplifying a received symbol set using its preamble, the receiver 406 demodulates and decodes the symbols in the symbol set.

After removing the cyclic prefix, the receiver 406 feeds the sampled discrete-time symbols into DFT module 436 to extract the sequence of N complex numbers representing the encoded data values (by performing an N-point DFT). Demodulator/Decoder module 438 maps the complex numbers onto the corresponding bit sequences and performs the appropriate decoding of the bits (including deinterleaving and descrambling).

Any of the modules of the communication system 400 including modules in the transmitter 402 or receiver 406 can be implemented in hardware, software, or a combination of hardware and software.

Network Interface

Figure 5A:
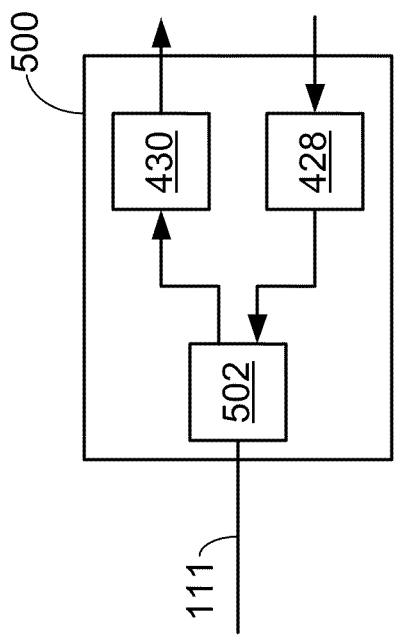
FIG. 5A is a schematic diagram of an analog front end module.

FIG. 5A illustrates an exemplary bidirectional AFE module 500 that serves as a network interface for a network device 112 that incorporates the functions of both transmitter 402 and receiver 406. The AFE module 500 uses coupling module 502 to receive a signal from the coaxial cable 111 to a receiver AFE module 430, and to transmit a signal from a transmitter AFE module 428 into the coaxial cable 111. This approach is a half-duplex approach in which the device 112 is either in a transmit mode or a receive mode at any given time.

Figure 5B:
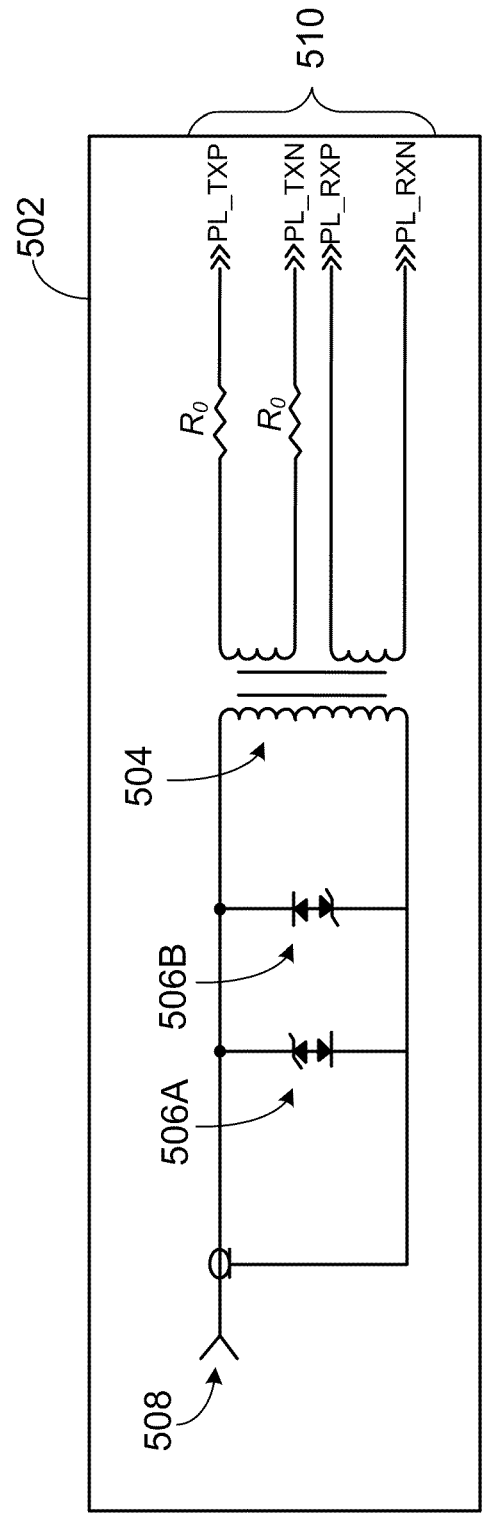
FIG. 5B is a circuit diagram of a coupling module.

FIG. 5B shows circuitry for one implementation of a coupling module 502. The circuitry includes a wideband toroidial transformer 504, transient protection diodes 506A and 506B, and an F series 75-Ohm female connector 508 to accept standard RG59 or RG6 coaxial cable. Terminals from the transformer 504 form a bidirectional signal interface 510 that includes a differential pair of transmit terminals PL_TXP and PL_TXN from the transmitter AFE module 428. These transmit terminals optionally include symmetric resistors with resistance $R_0$ to set the output impedance and resulting signal level. The signal interface 510 also includes a differential pair of receive terminals PL_RXP and PL_RXN to connect to the receiver AFE module 430. The effective input impedance of the network device 112 is selected by setting a resistance in the receiver AFE module 430 to the appropriate value.

Improved communication performance can be achieved when the output impedance of a network device 112 driving a signal onto a cable is less than the characteristic impedance of the coaxial cable 111.

Some wideband line drivers are operational amplifier circuits with feedback that achieve very low output impedances (a few Ohms or less). In some systems these drivers are matched to a system characteristic impedance using a series resistance equal to the system impedance. A voltage divider is formed by the series matching resistor and the system load impedance. One half of the driver output potential reaches the load resulting in 6 dB signal loss for the matched impedance case.

For communication techniques for which this impedance matching is not necessary (e.g., OFDM) the output impedance of a driver can be reduced to a few Ohms. The resulting loss due to the voltage divider is less than the previous case especially when low impedance loads are encountered. The low impedance driver achieves less loss and in some cases gain for many paths through the coaxial cable network 100 (relative to the 6 dB loss of a matched impedance driver). For example, an output impedance of about 5 Ohms for a 75-Ohm coaxial cable characteristic impedance provided robust performance for signals in the 2 to 28 MHz frequency range in a test coaxial cable network.

Improved performance can also be achieved when the input impedance of a network device 112 receiving a signal over a cable is larger than the characteristic impedance of the coaxial cable 111. In some preferred implementations, the effective input impedance of the network device 112 is selected to be at least 1.2, 2, 3, or 10 times larger depending on the desired coupling properties. For example, an input impedance of about 250 Ohms for a 75-Ohm coaxial cable characteristic impedance provided robust performance for signals in the 2 to 28 MHz frequency range in a test coaxial cable network.

Network Bridges

A bridge device 116 can use any of a variety of techniques to couple signals between the coaxial cable network 100 and the secondary network 120 depending on the characteristics of the networks. For example, OFDM signal modulation is well-suited for the nonlinear channel characteristics of both the mismatched coaxial cable network 100 and a power line network. A bridge device 116 can couple signals between coaxial cable and power line media "passively" without necessarily changing the signal modulation characteristics. A passive bridge device is able to preserve modulation characteristics of a communication signal such as the shape of the waveform used to modulate data, and therefore does not need to delay a signal for demodulation, buffering, and/or re-modulation.

Alternatively a bridge device 116 can be an "active" device that demodulates a signal received over one of the networks and buffers the encoded information for subsequent transmission over the other network. An active bridge device can switch between the networks accessing them one at a time. Alternatively, an active bridge can represent two logical network nodes with one operating in the first network (e.g., the coaxial cable network) and the other operating in the second network (e.g., a power line network). This type of active bridge device can potentially communicate in both networks at the same time. Both logical nodes inside the device can be implemented with a single processor and separate physical interfaces. This active approach introduces a delay in the signal as it passes through the bridge device 116.

The bridge device 116 can optionally be a simple coupling device that passes signals between two networks (passively or actively), or it can be incorporated into a fully functional network device 112 that serves as an origin and destination for transmitted signals as well as a bridge (passive or active).

In implementations in which the secondary network 120 is a power line communication network, the bridge device 116 includes components to filter out the low-frequency (e.g., 50 Hz or 60 Hz) power waveform, and components to protect against large transient surges in the power line. The communication signal waveform also carries power, however, the voltage level and corresponding average power of the communication signal (e.g., the amplitude of the OFDM symbols) is much smaller than that of a typical power waveform with a root-mean-square voltage in the range of 120-240V.

Figure 6:
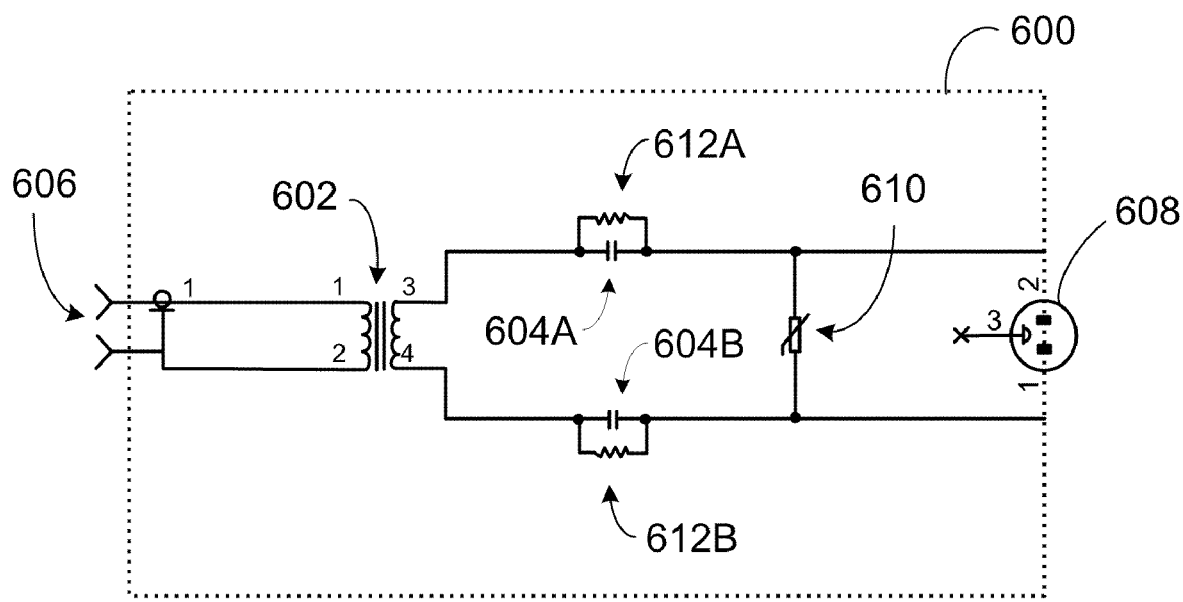
FIG. 6 is a circuit diagram of a passive bridge.

FIG. 6 shows a passive bridge 600 for bridging coaxial cable and power line networks in a house. The passive bridge 600 safely couples a communication signal (e.g., at 2-28 MHz) between the two networks while blocking the power signal (e.g., at 60 Hz) from crossing form the power line network to the coaxial cable network. The passive bridge 600 includes a wideband coupling transformer 602 that couples a differential mode signal in either direction between a coaxial cable interface 606 (e.g., an F series female coaxial cable connector) and a power line interface 608 (e.g., AC power plug prongs). In some implementations the transformer 602 has a 1:1 turns ratio. Alternatively, the transformer 602 can have a different turns ratio to provide an effective change in impedance. This bidirectional signal coupling enables the coaxial cable network and powerline network be part of the same broadcast domain in which the CSMA/CA MAC protocol operates. The transformer 602 also serves to block unintentional common mode energy (noise) while passing the desired differential mode signal energy. The transformer 602 can be fabricated with bifilar turns of wire on a ferrite toroid core. Triple insulated Teflon wire is used to provide safety isolation (with a 3 kV breakdown voltage) between the power line and coaxial cable networks.

The passive bridge 600 includes high-voltage series capacitors 604A and 604B (e.g., 0.01 microFrarad capacitors) which act as a high-pass filter to pass the desired high-frequency communication signal and block (or significantly attenuate, e.g., by a factor of 10, 100, or more) the low-frequency power waveform from passing through the transformer to the coaxial cable network 100. Capacitors 604A and 604B with safe failure modes can be used to preserve coupler safety in the event of component failure. Shunt resistors 612A and 612B (e.g., 200 kOhm resistors) dissipate any residual charge present on the capacitors when the bridge 600 is unplugged. A high-voltage varistor 610 maintains a high resistance for voltages within the expected operating range and switches to a low resistance conducting state to clamp large transient arriving on the power line that could exceed the breakdown voltage of the capacitors 604A and 604B. Alternatively, any of a variety of transient-suppression circuit elements can be used to block (or significantly attenuate) voltage transients, including, for example, a transient voltage suppression diode.

Figure 7:
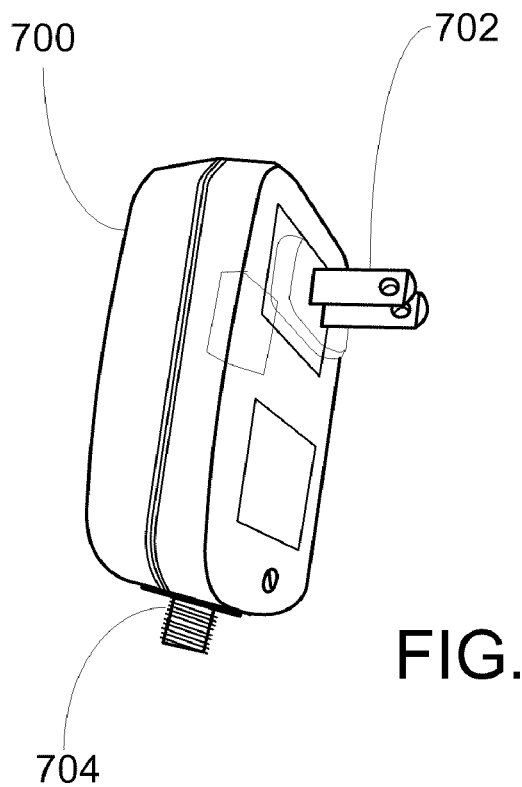
FIG. 7 is a representation of a passive bridge.

FIG. 7 shows an exemplary plastic housing 700 for the components of the passive bridge 600 with built-in AC power plug prongs 702 as the power line interface 608. During use, the bridge 600 plugs into an available AC power outlet in a house. The AC power plug prongs 702 are non-polarized and may be inserted with either orientation. A length of coax cable (e.g., 3 to 12 feet) may be used to connect an F connector 704 on the bridge 600 with an F connector port of the coaxial cable network 100.

Figure 8:
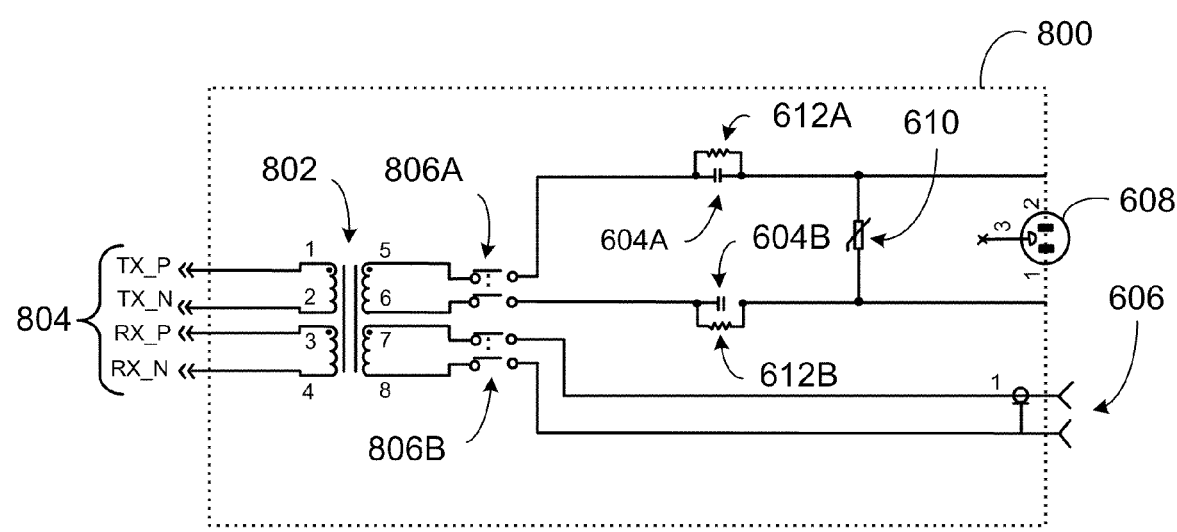
FIG. 8 is a circuit diagram of a hybrid coupler.

FIG. 8 shows a hybrid coupler 800 that couples a network device 112 to either or both of a coaxial cable network and a power line network, and optionally serves as a bridge between the coaxial cable and power line networks. The hybrid coupler 800 includes a wideband coupling transformer 802 with four isolated windings. The turns ratio is typically unity for all four windings. Triple insulated Teflon wire is used to provide safety isolation (with a 3 kV breakdown voltage) between the power line, coaxial cable, and the low voltage bidirectional signal interface 804. The signal interface 804 includes a differential pair of transmit terminals TX_P and TX_N that connect to the output of the transmitter AFE module 428, and a differential pair of receive terminals RX_P and RX_N that connect to the input of the receiver AFE module 430. These four lines are low voltage safety isolated connections.

The hybrid coupler 800 includes switches 806A and 806B to select power line only operation, coaxial cable only operation, or hybrid operation on both power line and coaxial cable media. The power line media connection includes the capacitors 604A and 604B, resistors 612A and 612B, the varistor 610, and the power line interface 608, as described above. The coaxial cable media connection includes the coaxial cable interface 606, as described above. The switches 806A and 806B are double pole single throw switches that make or break the differential connections between the coupling transformer 802 and the power line and coaxial cable media. The switches 806A and 806B can be set at the time of installation, or alternatively can be controllable via an external switch interface.

The power line and coaxial cable media are bridged together (in the manner of the passive bridge 600) when both switches 806A and 806B are closed. For example, closing both switches allows the network device 112 to communicate simultaneously on both the power line and coaxial cable networks. Closing both switches in a hybrid coupled network device 112 at a first node linked to both networks couples the two networks together so that a second node on the power line network can communicate with a third node on the coaxial cable network through the first node as a bridge.

Working Example

Figure 9:
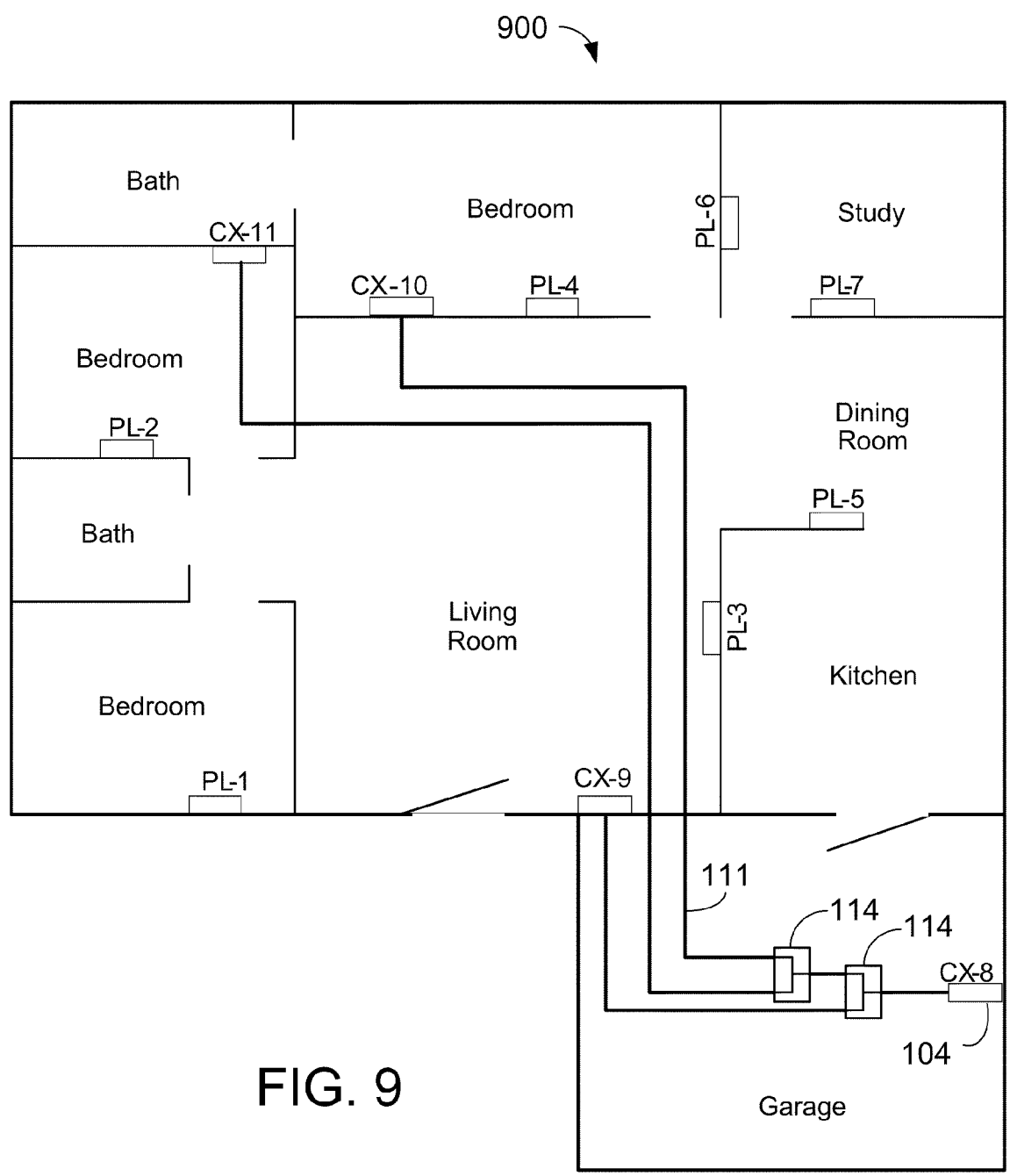
FIG. 9 is a plan view of a residential test site.

FIG. 9 shows a plan view of a residential test site 900 showing AC power outlets (power line ports PL-1 to PL-7) at which devices connect to a power line network, and coaxial cable ports (coaxial cable ports CX-8 to CX-11) at which devices connect to a coaxial cable network. The coaxial cable network has the topology of a tree network with two 2-way splitters connected by RG6 type coaxial cable 111. A source port CX-8 is configured to interface with a source (or "root") node of the tree network and to distribute a signal to devices connected to the coaxial cable ports CX-9 to CX-11 representing the leaf nodes of the tree network. The nominal insertion loss from port CX-8 to port CX-10 or port CX-11 was 7 dB, and the nominal insertion loss from port CX-8 to port CX-9 was 3.5 dB. The AC wiring of the power line network (not shown) forms a shared communication medium such that each power outlet shares a bidirectional communication path with every other power outlet.

The signal attenuation representing the port-to-port transfer response was measured between all pairs of ports(PL-1 to PL-7, and CX-8 to CX-11). The transfer response was measured in both directions (e.g., transmitting from port CX-8 to port CX-9, and transmitting from port CX-9 to port CX-8). Since many paths have attenuation that varies with frequency (e.g., exhibiting peaks and nulls) the average attenuation was calculated and recorded.

Figure 10:
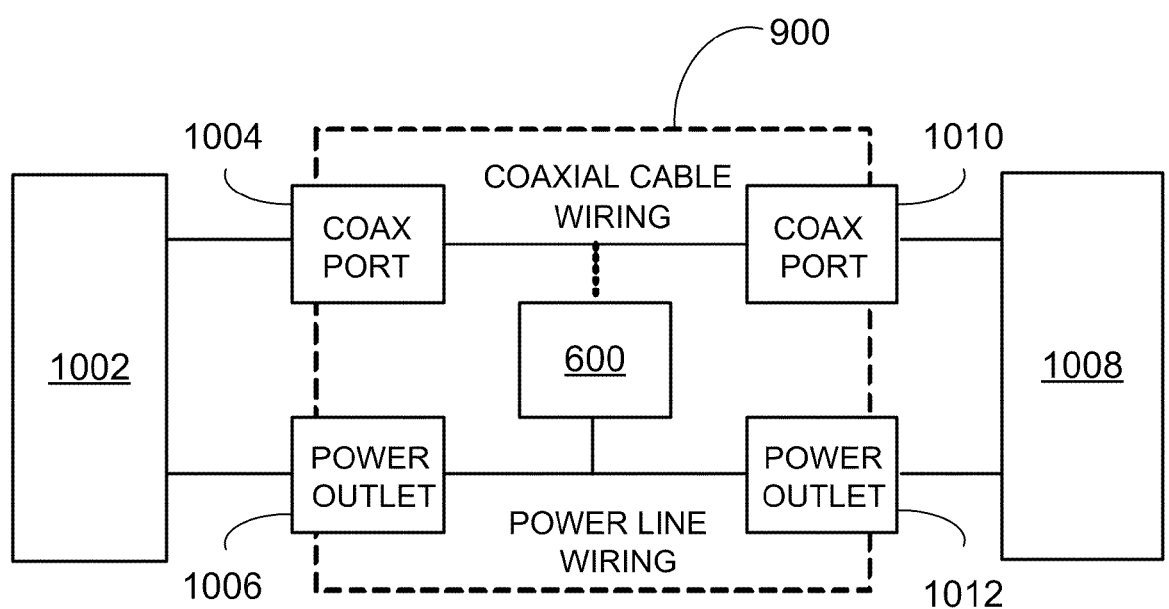
FIG. 10 is a schematic diagram of a test setup used to perform the transfer response test measurements.

FIG. 10 shows the test setup used to perform the transfer response test measurements. A first test node 1002 was coupled to either a coaxial cable port 1004 (one of the 4 ports of the test site 900) or a power outlet 1006 (one of the 7 outlets of the test site 900). A second test node 1008 was coupled to either a coaxial cable port 1010 (one of the 4 ports of the test site 900) or a power outlet 1006 (one of the 7 outlets of the test site 900). One of the test nodes was placed in a transmit mode and the other was placed in a receive mode. If the transmitting node was coupled to a coaxial cable port, then the output impedance of the transmitting node was set to a low value of about 5 Ohms. If the receiving node was coupled to a coaxial cable port, then the output impedance of the receiving node was set to a high value of about 250 Ohms.

Some of the measurements were performed with the coaxial cable and power line networks coupled using a passive bridge 600, and some of the measurements were taken with the coaxial cable and power line networks uncoupled (i.e., with the passive bridge 600 disconnected). In these test measurements, when the source port 104 was not participating in the measurement it remained disconnected (and therefore terminated with a mismatched open circuit impedance).

Figure 11A:
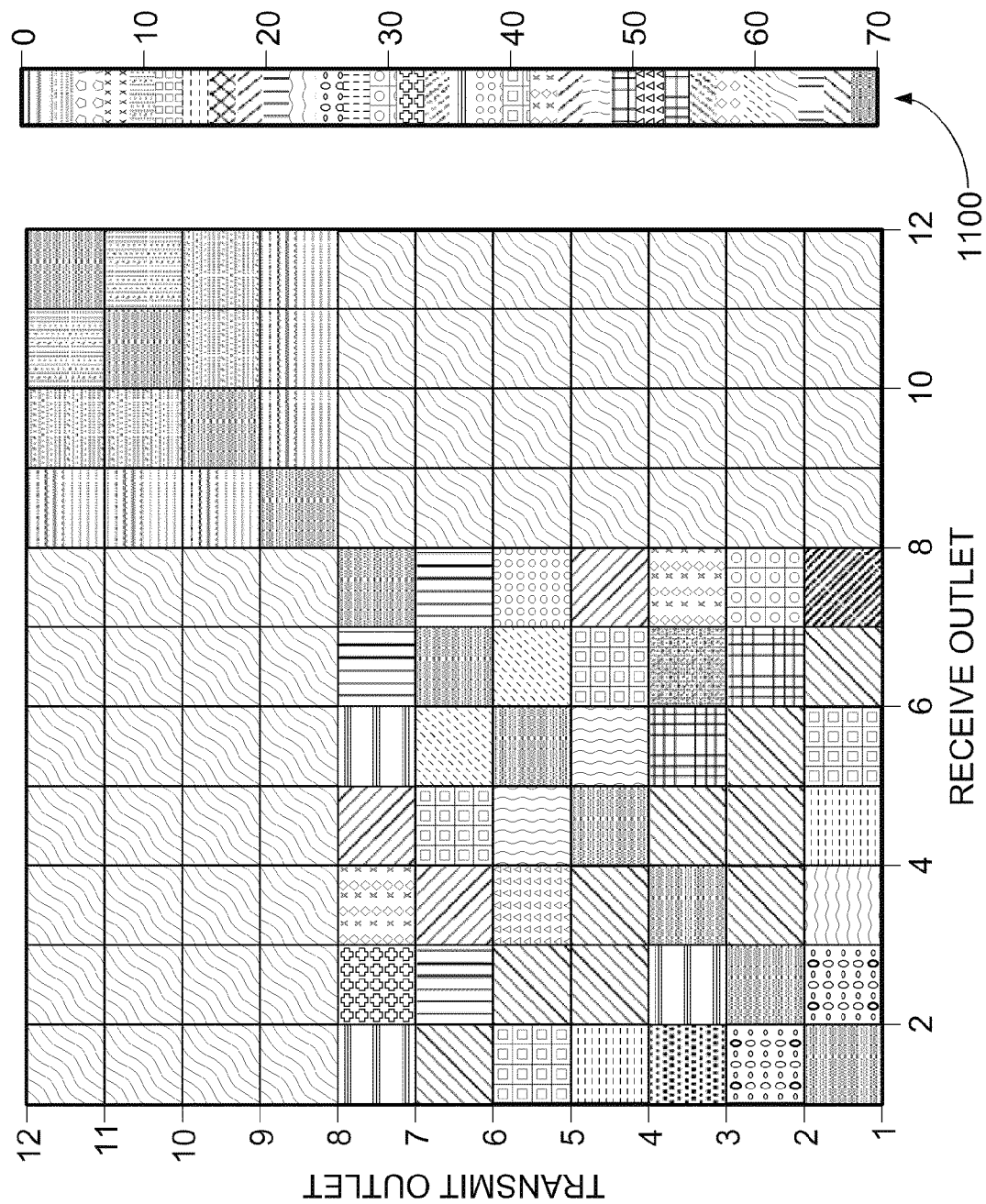
FIGS. 11A and 11B are grids showing measurement results.
Figure 11B:
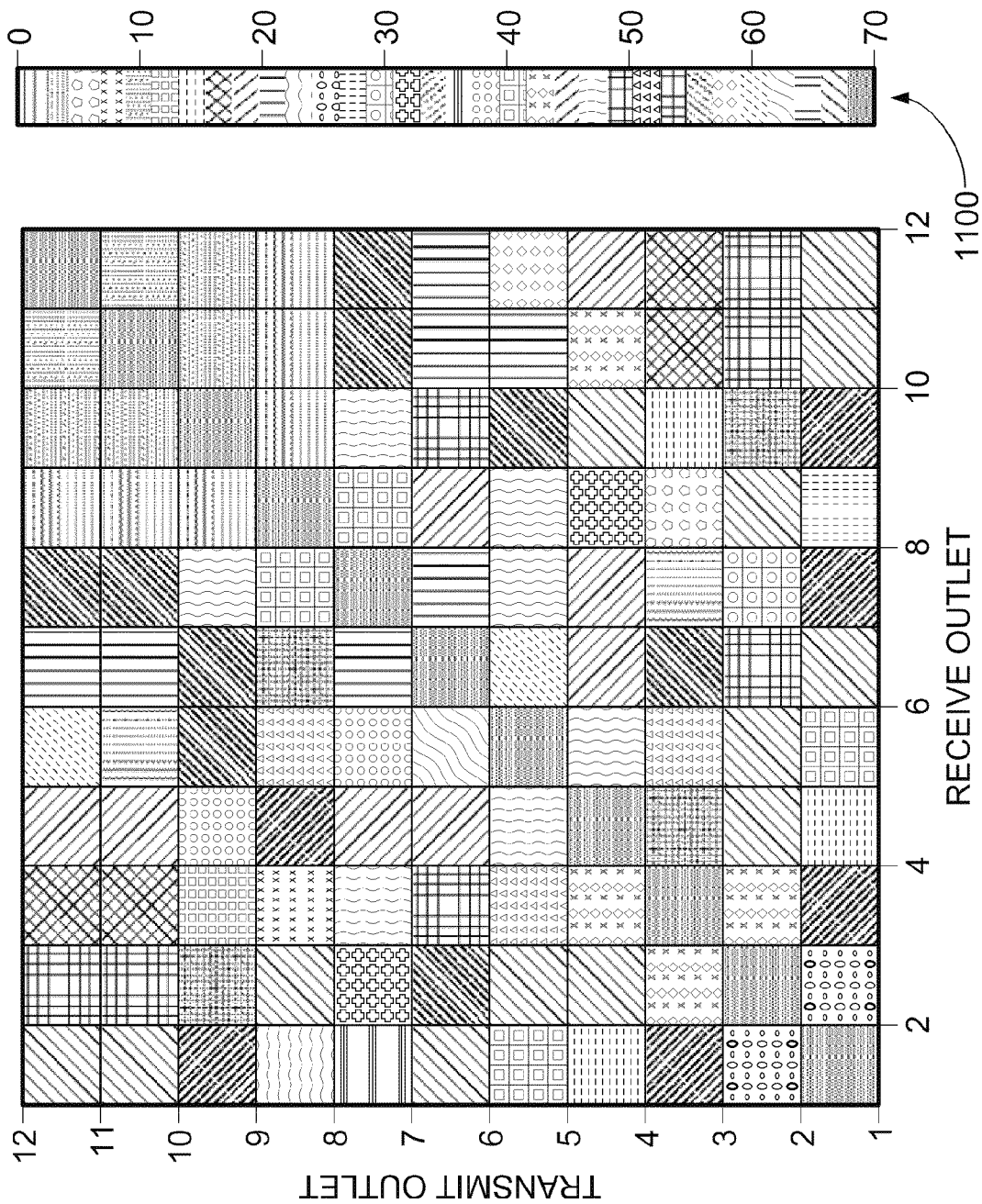

FIGS. 11A and 11B show grids representing the path attenuation measurements in which the row corresponds to the transmitting port (PL-1 to PL-7, and CX-8 to CX-11) and the column corresponds to the receiving port (PL-1 to PL-7, and CX-8 to CX-11). The shading at the intersection of a row and column is proportional to the path attenuation. The shaded squares represent attenuation levels according to the scale 1100. Since a port does not transmit to itself the diagonal squares (1 to 1, 2 to 2, etc) do not represent attenuation measurements.

The grid in FIG. 11A shows attenuation measurements between all pairs of ports and/or outlets with the passive bridge 600 disconnected such that the power line network and the coaxial cable network are uncoupled. The power line network connectivity is represented by the lower left quadrant (rows 1-7, columns 1-7) and the coaxial cable network connectivity is represented by the upper right quadrant (rows 8-11, columns 8-11). The average power line network attenuation is about 40 dB with a wide range of variation. The average coaxial cable network attenuation (with impedance mismatch) is less than 10 dB. The attenuation between networks is 60 dB or more (rows 1-7, columns 8-11, and rows 8-11, columns 1-7).

The grid in FIG. 11B shows attenuation measurements between all pairs of ports and/or outlets with the passive bridge 600 connecting the power line and coaxial cable networks. The average attenuation between power line outlets remains about the same. The average attenuation between the coaxial cable ports also shows little change. However, the average attenuation between the power line and coaxial cable networks is greatly improved (i.e., reduced attenuation). The average attenuation levels for these power line to coaxial cable and coaxial cable to power line paths (rows 1-7, columns 8-11, and rows 8-11, columns 1-7) are similar to those for power line to power line paths (rows 1-7, columns 1-7), on the order of 40 dB. These new communication paths provide greater convenience and coverage.

Additionally, the communication data rates were measured over these same paths and the average throughput over a set of paths in various network configurations were calculated, as summarized in Table 1 below.

TABLE 1

| Network | # Ports | # Paths | Bridge Present | Average Throughput |
| --- | --- | --- | --- | --- |
| Coax-Coax | 4 | 12 | NO | 117.5 mbps |
| Coax-Coax | 4 | 12 | YES | 118.2 mbps |
| PL-PL | 7 | 42 | NO | 72.1 mbps |
| PL-PL | 7 | 42 | YES | 69.6 mbps |
| PL-Coax | 11 | 56 | YES | 82.6 mbps |
| Complete | 11 | 110 | YES | 78.5 mbps |

One set of paths for which the average throughput was measured corresponds to the coaxial-to-coaxial paths (rows 8-11, columns 8-11), with and without the passive bridge 600 present. Another set of paths for which the average throughput was measured corresponds to the power line-to-power line paths (rows 1-7, columns 1-7), with and without the passive bridge 600 present. Another set of paths for which the average throughput was measured corresponds to the power line-to-coaxial paths (rows 1-7, columns 8-11, and rows 8-11, columns 1-7), with the passive bridge 600 present. The average throughput was also measured for all paths (rows 1-11, columns 1-11) with the passive bridge 600 present.

The presence of the passive bridge 600 did not have a large effect on the average throughput of the existing coaxial-to-coaxial and power line-to-power line paths, while greatly increasing the total number of paths available for communicating in the test site 900.

Many other implementations other than those described above are within the invention, which is defined by the following claims.

What is claimed is:

1. A method for communicating over a coaxial cable network, the method comprising:
    identifying at least one port in the coaxial cable network that provides high mutual isolation among nodes of the coaxial cable network when the port is terminated with an impedance that matches a characteristic impedance of coaxial cable in the coaxial cable network;
    terminating the identified port with an impedance that is substantially mismatched with the characteristic impedance of the coaxial cable; and
    transmitting a signal from a first node in the network to a second node in the network with at least one of the first node and the second node being coupled to the coaxial cable network with an impedance that is substantially mismatched with the characteristic impedance of the coaxial cable,
    wherein at least one of an output impedance of the first node and an input impedance of the second node has a value that changes in response to whether the node is in a transmit state or a receive state.

2. The method of claim 1, wherein the identified port comprises an input port to a splitter having at least two output ports that are mutually isolated when the input port is terminated with an impedance that matches the characteristic impedance of the coaxial cable.

3. The method of claim 2, wherein the splitter comprises a hybrid splitter.

4. The method of claim 1, wherein the identified port is positioned in the network to distribute an incoming signal from a source to terminal nodes of the coaxial cable network.

5. The method of claim 4, wherein the source is a cable television feeder cable, a terrestrial antenna, or a satellite dish.

6. The method of claim 4, wherein terminating the identified port with the mismatched impedance comprises coupling the incoming signal from the source to the identified port with an output impedance that is substantially mismatched with the characteristic impedance of the coaxial cable.

7. The method of claim 4, wherein terminating the identified port with the mismatched impedance comprises uncoupling the source from the identified port.

8. The method of claim 1, wherein transmitting the signal from the first node to the second node comprises coupling a signal from the first node with an output impedance that is substantially mismatched with the characteristic impedance of the coaxial cable.

9. The method of claim 8, wherein the output impedance is substantially smaller than the characteristic impedance of the coaxial cable.

10. The method of claim 9, wherein the output impedance is smaller than about 10% of the characteristic impedance of the coaxial cable.

11. The method of claim 1, wherein transmitting the signal from the first node to the second node comprises coupling a signal to the second node with an input impedance that is that is substantially mismatched with the characteristic impedance of the coaxial cable.

12. The method of claim 11, wherein the input impedance is substantially larger than the characteristic impedance of the coaxial cable.

13. The method of claim 1, wherein the coaxial cable network has a tree topology with the identified port at the root of the tree.

14. The method of claim 1, wherein the signal has a frequency in the range of approximately 2 to 28 MHz.

15. The method of claim 1, wherein the signal is coupled through a low-pass filter.

16. The method of claim 1, further comprising coupling the coaxial cable network to a secondary network using a bridge device.

17. A coaxial cable network comprising:
    a source port providing an input signal;
    a coaxial cable coupling the source port to a first splitter;
    a plurality of coaxial cables providing an interface for nodes of the network, at least some of the coaxial cables being coupled to the source port over a path that includes at least one splitter; and
    a first node configured to transmit a signal onto at least one of the coaxial cables with an associated output impedance;
    a second node configured to receive a signal from at least one of the coaxial cables with an associated input impedance;
    wherein at least one splitter port provides high mutual isolation among nodes of the coaxial cable network when the splitter port is terminated with an impedance that matches a characteristic impedance of coaxial cable in the coaxial cable network, and the splitter port is terminated with an impedance that is substantially mismatched with the characteristic impedance of the coaxial cable; and
    at least one of the first node and the second node is coupled to the coaxial cable network with an output impedance or input impedance, respectively, that is substantially mismatched with the characteristic impedance of the coaxial cable,
    wherein at least one of the output impedance of the first node and the input impedance of the second node has a value that changes in response to whether the node is in a transmit state or a receive state.

18. The coaxial cable network of claim 17, wherein the splitter port comprises an input port to the first splitter, the first splitter having at least two output ports that are mutually isolated when the input port is terminated with an impedance that matches the characteristic impedance of the coaxial cable.

19. The coaxial cable network of claim 18, wherein the coaxial cable network has a tree topology with the input port to the first splitter at the root of the tree.

20. The coaxial cable network of claim 17, wherein the first splitter is positioned in the network to distribute the incoming signal from the source port to terminal nodes of the coaxial cable network.

21. The coaxial cable network of claim 17, wherein the first node is configured to transmit a signal that has a frequency in the range of approximately 2 to 28 MHz.

22. The coaxial cable network of claim 17, wherein the first node is coupled to the coaxial cable interface through a low-pass filter.

23. The coaxial cable network of claim 17, further comprising a bridge device coupling the network to a secondary network.

* * * * *